(12) United States Patent
Cathey et al.

(10) Patent No.: US 7,075,926 B2
(45) Date of Patent: Jul. 11, 2006

(54) PROGRAMMABLE PACKET PROCESSOR WITH FLOW RESOLUTION LOGIC

(75) Inventors: Jim Cathey, Greenacres, WA (US); Timothy S. Michels, Greenacres, WA (US)

(73) Assignee: Alcatel Internetworking, Inc. (PE), Spokane, WA (US)

( * ) Notice: Subject to any disclaimer, the term of this patent is extended or adjusted under 35 U.S.C. 154(b) by 1105 days.

(21) Appl. No.: 09/751,194

(22) Filed: Dec. 28, 2000

(65) Prior Publication Data

US 2002/0085560 A1    Jul. 4, 2002

Related U.S. Application Data

(60) Provisional application No. 60/206,617, filed on May 24, 2000, provisional application No. 60/206,996, filed on May 24, 2000, provisional application No. 60/220,335, filed on Jul. 24, 2000.

(51) Int. Cl.
*H04L 12/56* (2006.01)

(52) U.S. Cl. ............... 370/389; 370/392; 370/395.32

(58) Field of Classification Search ........ 370/229–240, 370/389, 392, 395.2, 395.3, 400–411, 395.21, 370/395.32
See application file for complete search history.

(56) References Cited

U.S. PATENT DOCUMENTS

| | | | |
|---|---|---|---|
| 5,398,245 A | | 3/1995 | Harriman et al. |
| 5,917,821 A | * | 6/1999 | Gobuyan et al. ............ 370/392 |
| 6,157,955 A | * | 12/2000 | Narad et al. ................ 709/228 |
| 6,628,653 B1 | * | 9/2003 | Salim ......................... 370/389 |
| 6,778,534 B1 | * | 8/2004 | Tal et al. .................... 370/392 |
| 6,804,240 B1 | * | 10/2004 | Shirakawa et al. ......... 370/392 |

OTHER PUBLICATIONS

Brown et al., 'An IRAM-Based Architecture for a Single-Chip ATM Switch', TR-07-97, Center for Research in Computing Technology, Harvard University, Cambridge, Massachusetts, pp. 1-32.*

(Continued)

*Primary Examiner*—Chau Nguyen
*Assistant Examiner*—Tri H. Phan
(74) *Attorney, Agent, or Firm*—Craig A. Hoersten; V. Lawrence Sewell

(57) ABSTRACT

A programmable packet switching controller has a packet buffer, a pattern match module, a programmable packet classification engine and an application engine. The packet buffer stores inbound packets, and includes a header data extractor to extract header data from the inbound packets and to store the extracted header data in a header data cache. The header data extractor also generates a header data cache index and provides it to the packet classification engine for it to retrieve the extracted header data. The packet classification engine has a decision tree-based classification logic for classifying a packet. Each of the leaves of the tree represents a packet classification. The packet classification engine uses the header data cache index to retrieve the header data to perform multiple header checks, starting at a root of the tree and traversing branches until a leaf has been reached. The application engine has a number of programmable sub-engines arrayed in a pipelined architecture. The packet classification engine provides start indicators based on the packet classification to the programmable sub-engines to identify application programs to be executed. The sub-engines includes a source lookup engine, a destination lookup engine and a disposition engine, which are used to make a disposition decision for the inbound packets in a processing pipeline. The pattern match module is used to compare the packet to a pre-defined pattern in order to provide a disposition recommendation.

19 Claims, 8 Drawing Sheets

OTHER PUBLICATIONS

Wakeman, Ian, Ghosh, Atanu, Crowcroft, Jon, "Implementing Real Time Packet Forwarding Policies Using Streams," Nov. 14, 1994, pp. 71-82, XP002042874, Computer Science Department , University College London, Gower Street, London, United Kingdom. p. 71-76, left-hand Column and figures 1-3.

* cited by examiner

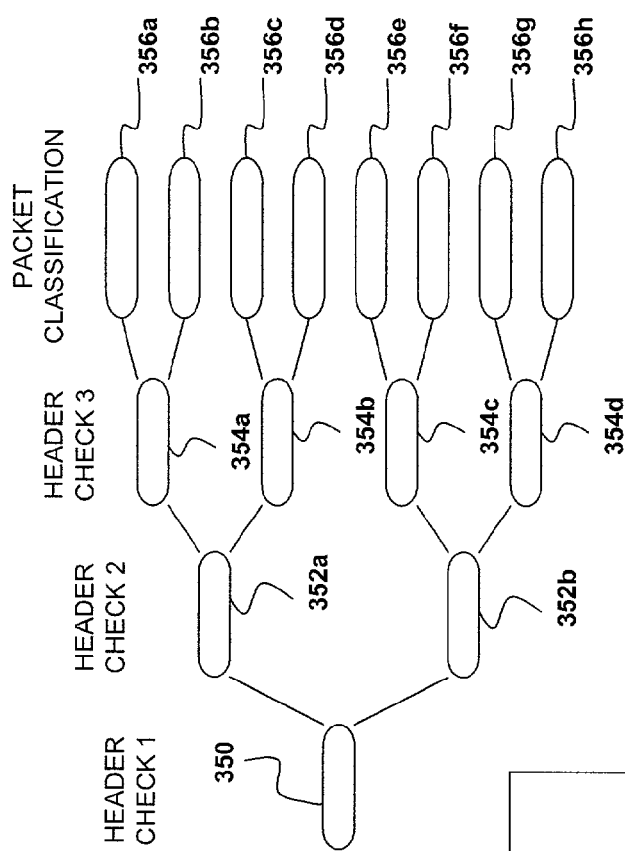
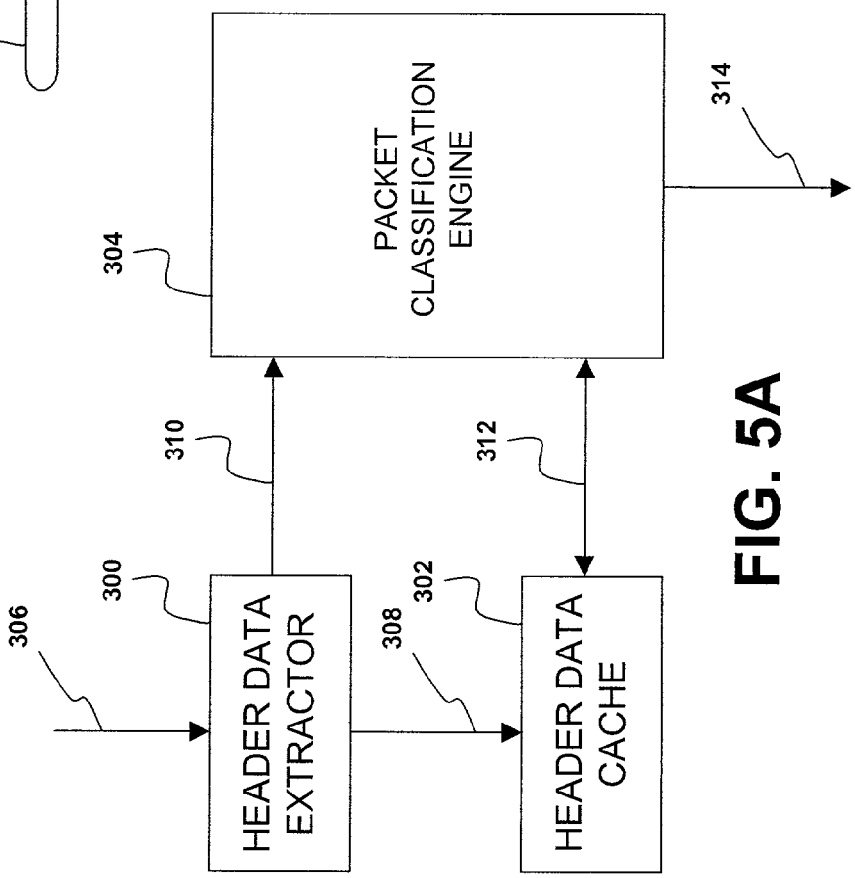
FIG. 5B
FIG. 5A

PROGRAMMABLE PACKET PROCESSOR WITH FLOW RESOLUTION LOGIC

CROSS-REFERENCE TO RELATED APPLICATIONS

This application claims the priority of U.S. Provisional Application No. 60/206,617 entitled "System and Method for Enhanced Line Cards" filed May 24, 2000, U.S. Provisional Application No. 60/206,996 entitled "Flow Resolution Logic System and Method" filed May 24, 2000 and U.S. Provisional Application No. 60/220,335 entitled "Programmable Packet Processor" filed Jul. 24, 2000, the contents of all of which are fully incorporated by reference herein.

BACKGROUND OF THE INVENTION

Many conventional packet switching controllers rely on fixed, i.e. non-programmable, logic to make the lion's share of packet decisions. Programmable logic has been relied on, if at all, to make decisions for "exceptional" packets. Such "hardwired" controllers, which make fixed logic the bulwark of decision-making and relegate programmable logic to at most a collateral role, have generally supported relatively high forwarding speeds but also a severely limited feature set. Feature limitations have been imposed by the general requirement of including discrete fixed logic for each application the controller is expected to support. This general requirement of application-specific fixed logic has limited the number of applications the controller can support and has made it difficult to "field upgrade" the controller to add application support. Instead, new application support has typically required a hardware upgrade.

Due to the relative inflexibility of hardwired switching controllers, controllers reliant on programmable logic for routine packet decision-making (particularly controllers having multiple programmable processors) have been given more attention in recent years. Such multiprocessor controllers, sometimes called "network processors", can typically support a variety of applications and are typically more amenable to field upgrades due to their programmable nature.

Within the realm of network processors, there is still room for architectural improvement. In particular, a network processor that provides the high degree of flexibility normally associated with network processors without substantially sacrificing the high speed of conventional hardwired controllers is desired. In addition, logic for classifying inbound packets to determine which applications to apply to which packets is desired for handling simultaneous multi-application support provided by network processors.

Therefore, it is desirable to provide a programmable network processor with an efficient classification logic that can process incoming packets at a rapid speed.

SUMMARY

In one embodiment of the present invention, a packet switching controller is provided. The packet switching controller includes a first engine and a second engine. The second engine includes one or more programmable elements. At least one programmable element contains one or more instruction sets. The first engine identifies an instruction set to be executed in the programmable element for a packet, and the programmable element executes the identified instruction set to process the packet.

In another embodiment of the present invention, a method of processing a packet using a packet switching controller is provided. The packet switching controller has a first engine and a second engine. The second engine includes one or more programmable elements. In the method, an instruction set to be executed for the packet is identified in at least one programmable element, and the identified instruction set is executed to process the packet.

In yet another embodiment of the present invention, a packet switching controller is provided. The packet switching controller includes programmable means for processing a packet. The programmable means contains a plurality of instruction sets configured thereon. The packet switching controller also includes means for identifying one or more of the plurality of instruction sets to process the packet. The programmable means processes the packet by executing the identified one or more of the plurality of instruction sets.

In still another embodiment of the present invention, a packet switching controller is provided. The packet switching controller includes a first engine containing packet classification logic for classifying a packet. The packet classification logic includes a decision tree having a root and a plurality of leaves. The plurality of leaves represents a plurality of classifications. The leaves are coupled to the root via one or more branches. One or more branches are traversed in response to a header check performed on the packet, and particular branches are traversed from the root to a particular leaf that represents the classification of the packet, in response to the header checks performed on the packet.

In a further embodiment of the present invention, a packet switching controller is provided. The packet switching controller includes a header data extractor for extracting data from a header of the packet. The header data extractor also generates a header data cache index. The packet switching controller also includes a header data cache for receiving the extracted data from the header data extractor and for storing the extracted data, as well as a first engine. The header data extractor provides the header data cache index to the first engine, and the first engine uses the index to retrieve at least a portion of the extracted data from the header data cache. The first engine applies the retrieved data in a header check to determine a classification for the packet.

In a still further embodiment of the present invention, a packet switching controller is provided. The packet switching controller includes a first engine for receiving a plurality of inputs, and for providing one or more outputs. The one or more outputs include a disposition decision for a packet. The plurality of inputs include one or more disposition recommendations for the packet, and the first engine programmatically generates the disposition decision for the packet, in response to the disposition recommendations, and in accordance with classification information.

BRIEF DESCRIPTION OF THE DRAWINGS

These and other aspects of the invention may be understood by reference to the following detailed description, taken in conjunction with the accompanying drawings, which are briefly described below.

FIG. 5A is a block diagram of a packet classification engine coupled to a header data extractor and a header data cache in one embodiment of the present invention;

FIG. 5B is a decision tree-based packet classification logic used by the packet classification engine of FIG. 5A;

DETAILED DESCRIPTION

I. Overview

Figure 1:
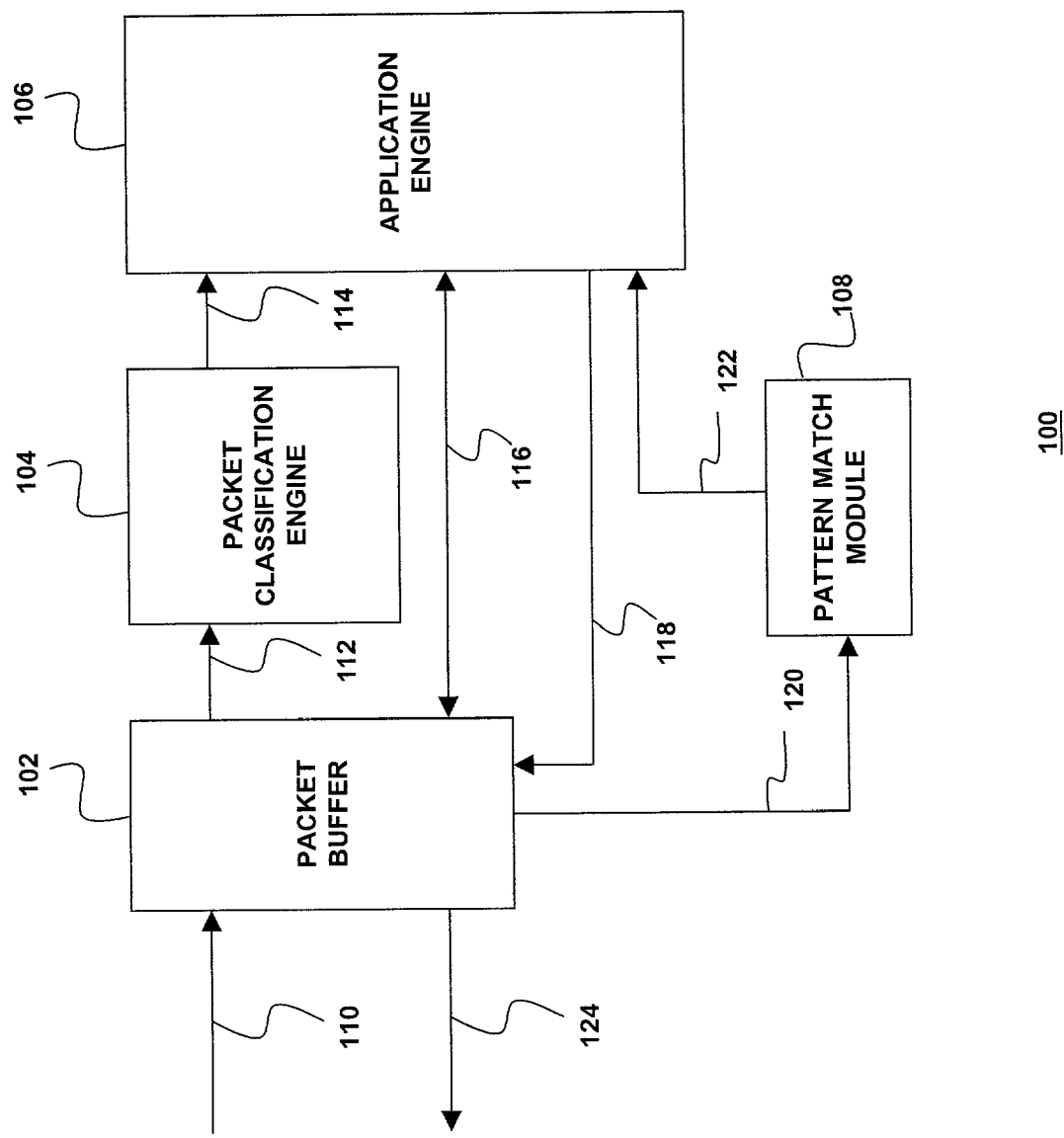
FIG. 1 is a block diagram of a programmable packet switching controller in one embodiment of the present invention.

FIG. 1 is a block diagram of a programmable packet switching controller 100 in one embodiment of the present invention. The programmable packet switching controller 100 preferably has flow resolution logic for classifying and routing incoming flows of packets. Programmable packet switching controllers in other embodiments may include a lesser number of components. For example, a programmable packet switching controller in another embodiment may not include a pattern match module. Further, programmable packet switching controllers in still other embodiments may include other components, such as, for example, a policing engine, in addition to or instead of the components included in the programmable packet switching controller 100.

Due to its programmable nature, the programmable packet switching controller preferably provides flexibility in handling many different protocols and/or field upgradeability. The programmable packet switching controller may also be referred to as a packet switching controller, a switching controller, a programmable packet processor, a network processor, a communications processor or as another designation commonly used by those skilled in the art.

The programmable packet switching controller 100 includes a packet buffer 102, a packet classification engine 104, an application engine 106 and a pattern match module 108. The programmable packet switching controller 100 preferably receives inbound packets 110. The packets may include, but are not limited to, Ethernet frames, ATM cells, TCP/IP and/or UDP/IP packets, and may also include other Layer 2 (Data Link/MAC Layer), Layer 3 (Network Layer) or Layer 4 (Transport Layer) data units. Therefore, for example, the packet buffer 102 may receive inbound packets from one or more Media Access Control (MAC) Layer interfaces over the Ethernet.

The received packets preferably are stored in the packet buffer 102. The packet buffer 102 may include a packet FIFO for receiving and temporarily storing the packets. The packet buffer 102 preferably provides the stored packets or portions thereof to the packet classification engine 104, the application engine 106 and the pattern match module 108 for processing.

The packet buffer 102 may also include an edit module for editing the packets prior to forwarding them out of the switching controller as outbound packets 124. The edit module may include an edit program construction engine for creating edit programs real-time and/or an edit engine for modifying the packets. The application engine 106 preferably provides application data 116, which may include a disposition decision for the packet, to the packet buffer 102, and the edit program construction engine preferably uses the application data to create the edit programs. The outbound packets 124 may be transmitted over a switching fabric interface to communication networks, such as, for example, the Ethernet.

The packet buffer 102 may include either or both a header data extractor and a header data cache. The header data extractor preferably is used to extract one or more fields from the packets, and to store the extracted fields in the header data cache as extracted header data. The extracted header data may include, but is not limited to, some or all of the packet header. In an Ethernet system, for example, the header data cache may also store first N bytes of each frame.

The extracted header data preferably is provided in an output signal 112 to the packet classification engine 104 for processing. The application engine may also request and receive the extracted header data over an interface 116. The extracted header data may include, but are not limited to, one or more of Layer 2 MAC addresses, 802.1P/Q tag status, Layer 2 encapsulation type, Layer 3 protocol type, Layer 3 addresses, ToS (type of service) values and Layer 4 port numbers. In other embodiments, output signal 112 may include the whole inbound packet, instead of or in addition to the extracted header data. In still other embodiments, the packet classification engine 104 may be used to edit the extracted header data to be placed in a format suitable for use by the application engine, and/or to load data into the header data cache.

The packet classification engine 104 preferably includes a programmable microcode-driven embedded processing engine. The packet classification engine 104 preferably is coupled to an instruction RAM (IRAM) (not shown). The packet classification engine preferably reads and executes instructions stored in the IRAM. In one embodiment, many of the instructions executed by the packet classification engine are conditional jumps. In this embodiment, the classification logic includes a decision tree with leaves at the end points that preferably indicate different types of packet classifications. Further, branches of the decision tree preferably are selected based on comparisons between the conditions of the instructions and the header fields stored in the header data cache. In other embodiments, the classification logic may not be based on a decision tree.

In one embodiment of the present invention, the application engine 106 preferably has a pipelined architecture wherein multiple programmable sub-engines are pipelined in series. Each programmable sub-engine preferably is used to perform an action on the packet, and forwards the packet to the next programmable sub-engine. The packet classification engine preferably starts the pipelined packet processing by starting the first programmable sub-engine in the application engine using a start signal 114. The start signal 114 may include identification of one or more programs to be executed in the application engine 106. The start signal 114 may also include packet classification information. The programmable sub-engines in the application engine preferably have direct access to the header data and the extracted fields stored in the header data cache over the interface 116.

The application engine may include other processing stages not performed by the programmable sub-engines, however, the decision-making stages preferably are performed by the programmable sub-engines to increase flexibility. In other embodiments, the application engine may include other processing architectures.

In one embodiment of the present invention, the pattern match module 108 preferably is used to compare the header fields of the packets to a predetermined pattern. The pattern match module 108 preferably provides a result 122 of the pattern match to the application engine 106. The predetermined pattern may be stored in the pattern match module, or it may be read from an external RAM as needed. The predetermined pattern may be compared against one or more header fields and/or it may be compared against some or all of the payload data. The result 122 of the pattern match may include a single bit, which indicates whether or not the match has been found.

Figure 2:
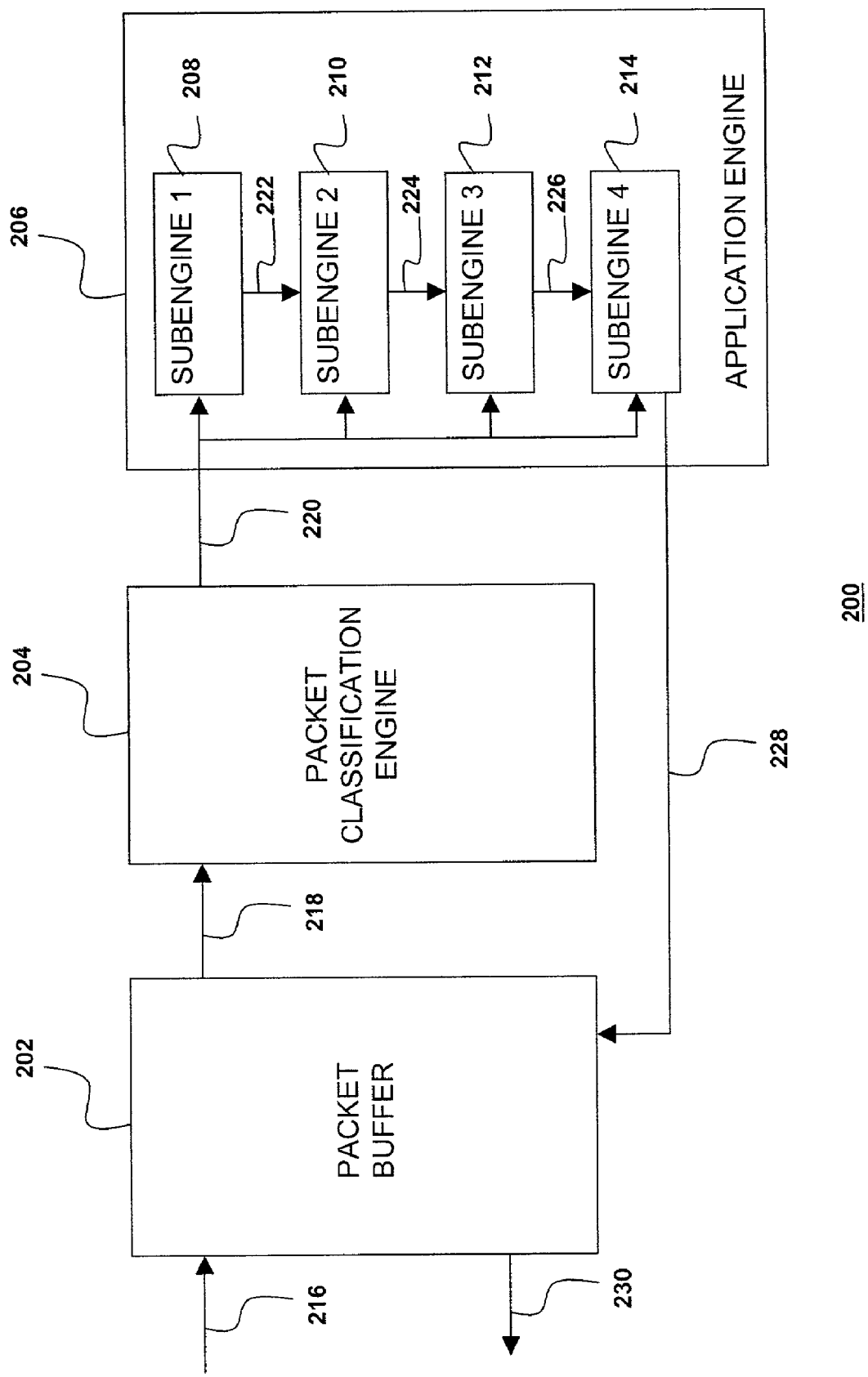
FIG. 2 is a block diagram of a programmable packet switching controller in one embodiment of the present invention, showing in detail an application engine.

II. Application Engine Having a Plurality of Programmable Sub-Engines Arrayed in a Pipelined Architecture FIG. 2 is a block diagram of a programmable packet switching controller 200 in one embodiment of the present invention. The switching controller 200 includes a packet buffer 202, a packet classification engine 204 and an application engine 206. The packet buffer 202 may be similar, for example, to the packet buffer 102 of FIG. 1, and the packet classification engine 204 may be similar, for example, to the packet classification engine 104 of FIG. 1. In addition, the application engine 206 may be similar, for example, to the application engine 106 of FIG. 1.

The programmable packet switching controller 200 may include other components in addition to or instead of the components illustrated in FIG. 2. For example, the packet classification engine 204 and the application engine 206 preferably form one channel of packet processing. The programmable packet switching controller may include one or more other channels that are similar to the channel formed by the packet classification engine 204 and the application engine 206. When the programmable packet switching controller includes multiple packet processing channels, some of the components, such as, for example, an address table (not shown) may be shared by some or all of the multiple channels.

The packet buffer 202 preferably receives and stores inbound packets 216. For example, the packet buffer 202 may receive the inbound packets 216 over the Ethernet via a MAC Layer interface. The packet buffer 202 preferably then provides the packets or portions of the packets thereof to the packet classification engine 204. The packet buffer 202 may store a number of inbound packets. The packet buffer 202 preferably has a capacity to contain one or more inbound packets at the same time.

The packet buffer 202 may also include an application RAM. Using the application RAM, the packet buffer 202 preferably provides identification (ID) of the application that runs on top of the communications protocol. In particular, the packet buffer 202 may include a header data extractor, which may also be referred to as a field extractor, to determine the application ID, and to store the application ID in a header data cache, which may also be included in the packet buffer.

The application ID may be provided to the packet classification engine 204 and/or the application engine 206 to determine application dependent information. The downstream programmable engines may then use the application ID and/or other information to charge customers with. For example, the ID of the application may be used by the application engine to bill charges to a particular customer for a particular use. In such a case, if customer A, for example, performs a web browse function (e.g., application ID X), which may use a relatively small amount of resources, customer A preferably is charged less than customer B who, for example, performs a multimedia access function (e.g., application ID Y), which may use a relatively large amount of resources.

The packet classification engine 204 preferably is programmable, wherein the packet classification engine executes instructions stored in an attached IRAM (not shown). In other embodiments, the IRAM may be integrated with the packet classification engine. In still other embodiments, the classification engine 204 and the application engine 206 may share a single IRAM.

The application engine 206 preferably receives an output signal 220 from the packet classification engine 204. The application engine includes four programmable sub-engines 1–4 (208, 210, 212 and 214). The sub-engines 1–4 preferably are microcode-driven embedded processing engines. In other embodiments, the application engine may include more or less than four sub-engines. The sub-engines 1–4 preferably are arrayed in a pipelined architecture, wherein the sub-engine 1 (208) provides an output 222 to the sub-engine 2 (210), the sub-engine 2 provides an output 224 to the sub-engine 3 (212) and the sub-engine 3 provides an output 226 to the sub-engine 4 (214).

The output signal 220 preferably includes a program identification for each of the sub-engines 1–4. The program identification may also be referred to as a start indicator (for indicating the start of an application program). In the application engine illustrated in FIG. 2, the output signal 220 is provided to each of the sub-engines 1–4. Each start indicator preferably includes a pointer that points to the start of the instructions to be executed in a sub-engine. A group of instructions may be referred to as an instruction set, a routine or a program. The group of instructions may start at a starting address and end at an ending address. In other embodiments, the output signal 220 may be provided only to the sub-engine 1, the sub-engine 1 may provide the program identification information to the sub-engine 2, the sub-engine 2 may provide the program identification information to the sub-engine 3, and so on.

In practice, each of the sub-engines 1–4 (208, 210, 212, 214) may include or be coupled to an instruction RAM (IRAM). The sub-engines 1–4 preferably are configured to have a bucket-brigade architecture, wherein the sub-engines process the inbound packets in stages. For example, the packet classification engine 204 preferably starts the sub-engine 1 to start executing sub-engine 1's application program at the address in its IRAM indicated by the corresponding start indicator. At the end of its instructions to be executed, the sub-engine 1 preferably halts itself, and starts the sub-engine 2 to start executing sub-engine 2's application program at the address in its IRAM indicated by the corresponding start indicator. Likewise, the sub-engine 2 and sub-engine 3 preferably halt themselves, respectively, and start their respective next stage sub-engine. Each sub-engine may overwrite the start address for the next stage sub-engine indicated by the start indicator from the packet classification engine 204.

The sub-engine 4 preferably provides an output signal 228 to the packet buffer 202. The output signal 228 preferably includes application data, which may include a disposition decision for the packet. The application data may be generated as a function of source address data, destination address data and/or as a function of a service classifier associated with the packet. The application data may also be generated using information from other packet header data and/or packet payload data. The application data may include, but is not limited to, one or more of accounting data, routing data and policing data. The packet buffer preferably edits the packets based on the application data and transmits them as outbound packets 230. In other embodiments, the programmable packet switching controller 200 may include an edit engine separate and apart from the packet buffer 202. In such cases, the packet buffer preferably holds the data, and the edit engine preferably reads from the packet buffer, and preferably edits the data as it is streamed out to a switching fabric interface.

Figure 3:
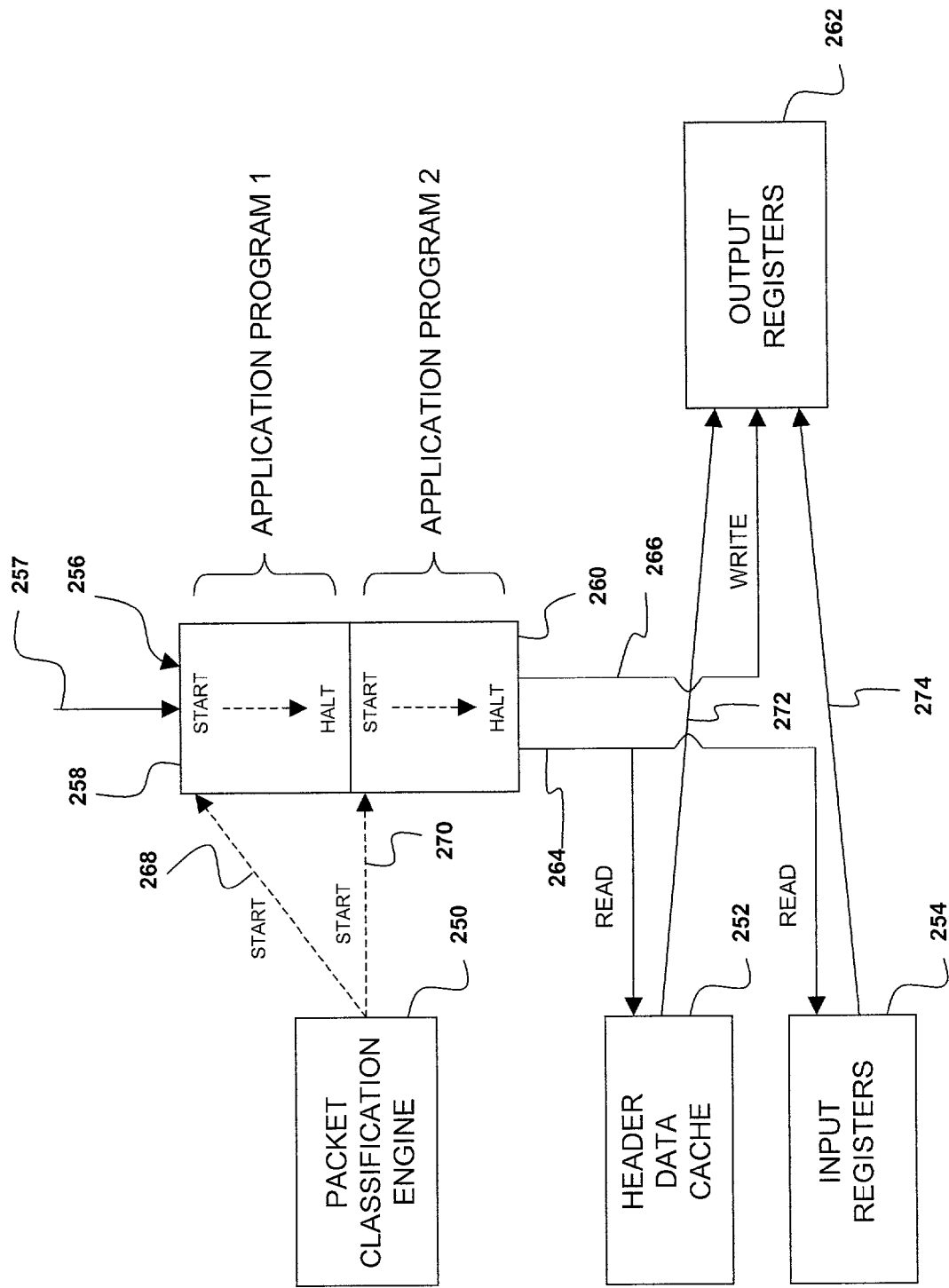
FIG. 3 is a block diagram of packet processing in an application engine with a pipelined architecture in one embodiment of the present invention.

FIG. 3 is a block diagram of packet processing in an application engine with a pipelined architecture. Each sub-engine in the application engine preferably is associated with an instruction RAM (IRAM) 256. The IRAM 256 may be attached to the sub-engine or may be integrated in the associated sub-engine. The IRAM in each sub-engine may be loaded with one or more application programs using a program configuration input 257. An application program 1 (258) and an application program 2 (260) are shown in FIG. 3 for illustrative purposes only. The IRAM may be configured with one or more application programs. Each application program preferably starts and halts, respectively, at a particular memory location. The application programs need not occupy contiguous memory locations within the IRAM.

A packet classification engine 250, which may be similar, for example, to the packet classification engine 204 of FIG. 2, preferably provides start indicators 268 and 270 to the corresponding sub-engine to indicate address of the application programs to be executed in the associated IRAM. For example, the packet classification engine would preferably provide the start indicator 268 and the start indicator 270, respectively, to indicate the address of the application program 1 (258) and the application program 2 (260).

As described above, the packet classification engine and the sub-engines of the application engine preferably contain one or more application programs. Further, the packet classification engine and the sub-engines may also include fixed functions that are built from dedicated (e.g., hardwired) hardware. Use of the dedicated hardware typically results in efficient processing. However, the decision-making functions preferably are implemented using the application programs so as to increase flexibility of the packet switching controller to be adaptable to shifts and changes in networking standards and/or marketing requirements.

The application programs preferably include read instructions for reading from a header data cache 252 and input registers 254. The input registers 254 preferably are included in the sub-engine being used to execute the application programs 258, 260. The header data cache 252 preferably is included in a packet buffer, such as, for example, the packet buffer 202 of FIG. 2. Each of the sub-engines in the programmable packet switching controller, such as, for example, the sub-engines 1–4 of FIG. 2, preferably has access to the header data stored in the header data cache.

The header data cache preferably contains packet header data, which may include, without being limited to, one or more of Layer 2 MAC addresses, 802.1P/Q tag status, Layer 2 encapsulation type, Layer 3 protocol type, Layer 3 addresses, ToS values and Layer 4 port numbers. The header data cache may have a capacity to store at the same time the extracted header data from all the packets being processed in the programmable packet switching controller.

The input registers for the first sub-engine in series, e.g., the sub-engine 1 of FIG. 2, preferably receives their contents from the packet classification engine 250. The first sub-engine preferably processes data from the header data cache and the input registers. The application programs preferably include a write instruction 266 to write to output registers 262. The first sub-engine preferably writes the processed data to its output registers. The data 272 from the header data cache 252 may also be written to the output registers.

Figure 4:
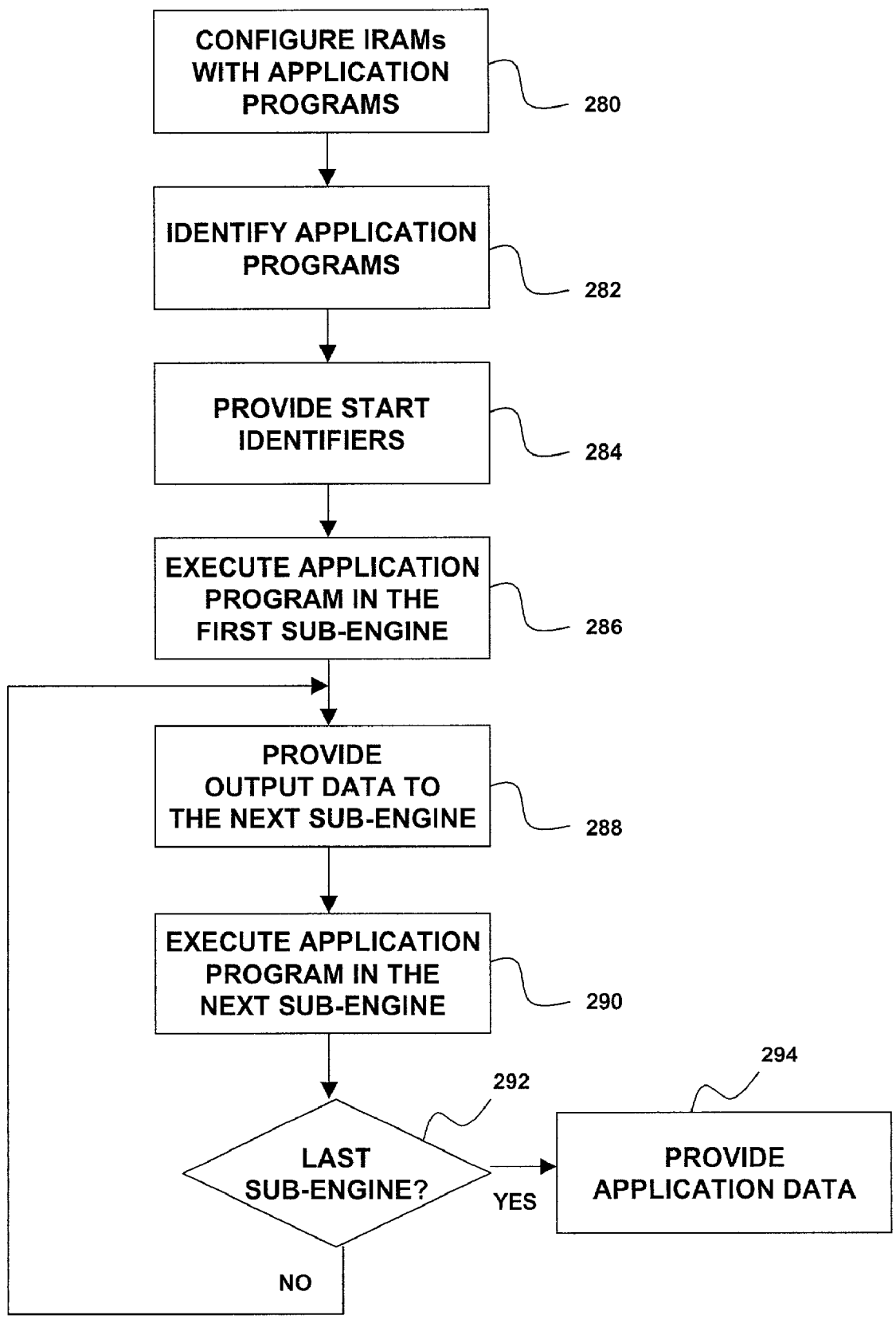
FIG. 4 is a flow diagram of packet processing in an application engine with a pipelined architecture in one embodiment of the present invention.

FIG. 4 is a flow diagram of packet processing in an application engine having a pipelined architecture, such as, for example, the application engine 206 of FIG. 2, in one embodiment of the present invention. In step 280, the IRAMs associated with the sub-engines in the application engine preferably are configured by loading application programs. The configuration of the IRAMs preferably is performed at the time of boot-up of the programmable packet switching controller. From then on, the application programs preferably remain static until the programmable packet switching controller is reset. Once configured, each IRAM preferably contains one or more application programs.

In step 282, a packet classification engine, such as, for example, the packet classification engine 250 of FIG. 3, preferably identifies application programs to be executed by the sub-engines. The packet classification engine preferably uses packet data such as the header data (e.g., extracted fields) in the header data cache and/or the payload data to identify the application programs.

Then in step 284, the packet classification engine preferably provides start identifiers that indicate the starting memory location (e.g., address) of the application programs to instruct the sub-engines of which application programs to execute. As discussed earlier, the identification of the application programs to be executed may be overwritten (i.e., changed) by each of the downstream sub-engines for their respective next stage sub-engine.

In step 286, the first sub-engine preferably executes the identified application program. The first sub-engine preferably is instructed to execute the identified application program through the use of a start command, which may include only a single bit. In step 288, the first sub-engine preferably provides output data to the next stage sub-engine, i.e., the second sub-engine.

In step 290, the next sub-engine preferably executes the identified application program using the packet headers from the header data cache and the output data from the preceding sub-engine, i.e., the first sub-engine. For this, the first sub-engine preferably halts itself at the end of its application program, and starts the next sub-engine, i.e., the second sub-engine. From then on, each subsequent sub-engine halts itself at the end of the application program, provides the output data to the next sub-engine, and starts the next sub-engine, until the last sub-engine executes its application program as indicated in step 292.

In step 294, the last sub-engine preferably provides the application data to the packet buffer. The packet buffer preferably edits the inbound packet into an outbound packet. The packet buffer may include an edit engine for such editing. In other embodiments, where the edit engine resides outside of the packet buffer, the application data preferably is provided to the edit engine for editing the inbound packet.

III. Programmable Packet Classification Engine with Decision Tree-Based Classification Logic FIG. 5A is a block diagram of a packet classification engine 304 coupled to a header data extractor 300 and a header data cache 302 in one embodiment of the present invention. The packet classification engine 304 may be similar to the packet classification engine 204 of FIG. 2. The header data extractor 300 and the header data cache 302 may be included in a packet buffer, such as the packet buffer 202 of FIG. 2. The header data extractor 300 may also be referred to as a field extractor.

The header data extractor 300 preferably receives inbound packets 306, and extracts header data 308. The header data extractor preferably analyzes the inbound packets as they are received, and preferably identifies key characteristics (extracted header data). The extracted header data may be in the form of status flags and extracted fields. The extracted header data may include, but are not limited to, one or more of Layer 2 MAC addresses, 802.1P/Q tag status, Layer 2 encapsulation type, Layer 3 protocol type, Layer 3 addresses, ToS values and Layer 4 port numbers.

The header data extractor preferably stores the extracted header data in the header data cache 302. The header data extractor preferably provides a header data cache index to the packet classification engine 304. Using the header data cache index, the packet classification engine preferably retrieves the header data from the header data cache 302 over an interface 312. The packet classification engine 304 preferably determines classifications for the inbound packets using the retrieved header data. In other embodiments, the header data index may also be provided to one or more sub-engines in the application engine to facilitate their access to the header data.

The packet classification engine preferably has a packet classification logic configured as a decision tree having a root, multiple branches and multiple leaves. FIG. 5B represents the packet classification logic architecture used by the packet classification engine in one embodiment of the present invention. The packet classification logic in FIG. 5B has four levels, including a root level, two node levels, and a leaf level, for illustrative purposes only. The packet classification logic in practice may have more or less than four levels.

The first level includes a root 350, the second level includes nodes 352a–b, the third level includes nodes 354a–d and the fourth level includes leaves 356a–h. The classification process by the packet classification logic preferably starts at the root with each new packet. A decision, e.g., a conditional jump (branching), preferably is made at the root 350 and at each of the nodes. Based on the outcome of the decision, a different branch is traversed from the root to one of the second level nodes, from one of the second level nodes to one of the third level nodes, and from one of the third level nodes to one of the leaves.

The process of making a decision at each level may also be referred to as a header check. The header checks may be performed on various different extracted fields of the header data. For example, a header check 1 taken at the root may include a source address (e.g., Internet Protocol Source Address (IPSA)) comparison, a header check 2 taken at the second level may include a destination address (e.g., Internet Protocol Destination Address (IPDA)) comparison, and a header check 3 taken at the third level may include a QoS comparison. Through the header checks in the decision tree of FIG. 5B, the root 350 preferably is coupled to one of the packet classifications 356a–h via a number of linked branches. The linked branches may link between the root and a second level node, from the second level node to a third level node, and from the third level node to a leaf (packet classification).

For example, the root 350 may be linked to either the node 352a or the node 352b over a respective branch depending on the result of the header check 1. If the root has been linked to the node 352a, the node 352a may be linked to either the node 354a or the node 354b depending on the result of the header check 2. If the node 352a has been linked to the node 354a, the node 354a may be linked to either the leaf 356a or the leaf 356b depending on the result of the header check 3. Thus, each of the leaves 356a–h preferably is coupled to the root 350 via a unique set of linked branches, wherein one linked branch preferably is taken at each header check. Each of the leaves preferably has an associated halt instruction, which indicates the end of the classification process for the packet being processed.

Figure 6:
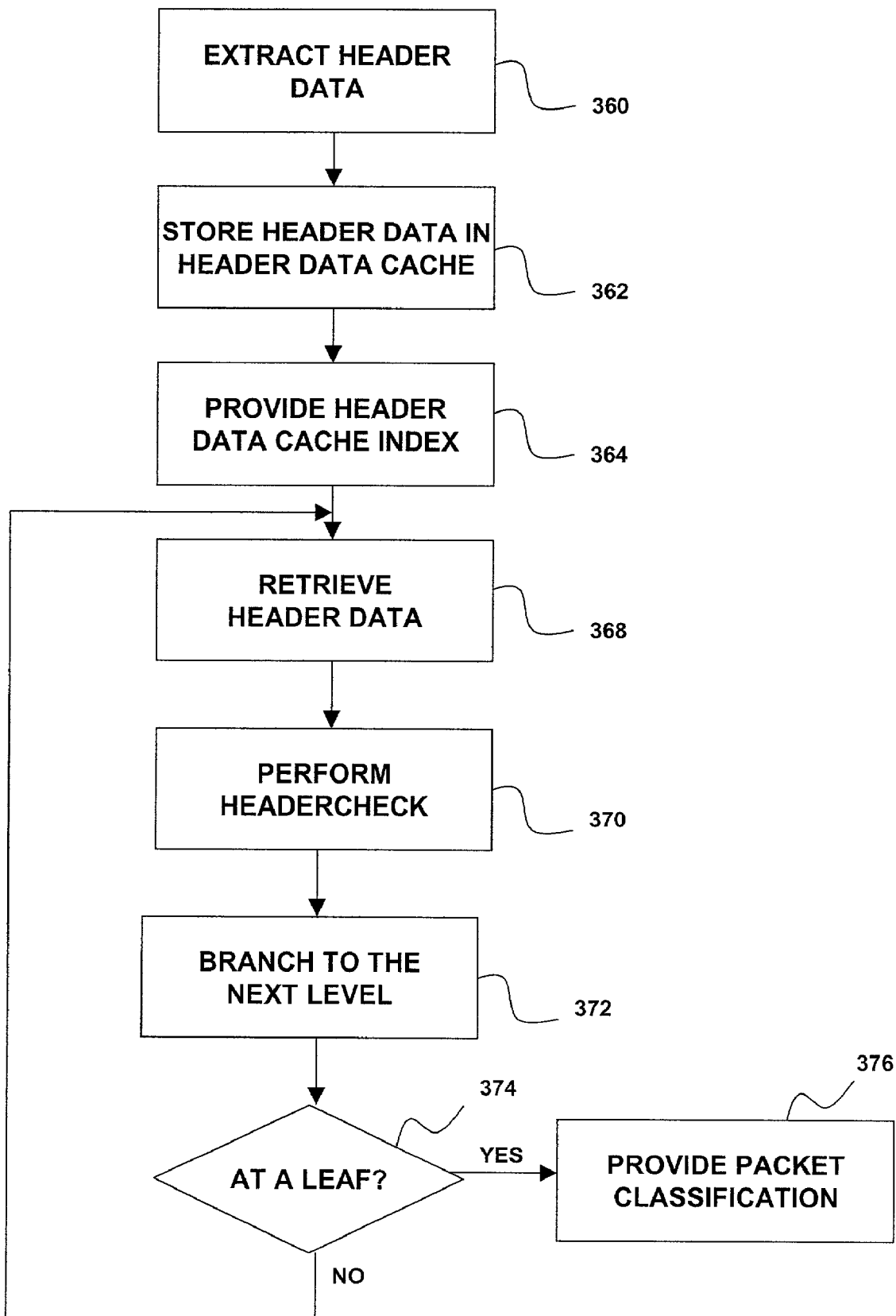
FIG. 6 is a flow diagram of a process of classifying a packet using a decision tree-based classification logic in one embodiment of the present invention.

FIG. 6 is a flow diagram of a process of classifying a packet using a decision tree-based classification logic in one embodiment of the present invention. In step 360, a header data extractor, such as, for example, the header data extractor 300 of FIG. 5A, preferably extracts header data of an inbound packet. The extracted header data may include one or more of, but is not limited to, Layer 2 MAC addresses, 802.1P/Q tag status, Layer 2 encapsulation type, Layer 3 protocol type, Layer 3 addresses, ToS values and Layer 4 port numbers.

In step 362, the header data extractor preferably stores the extracted header data in a header data cache, such as, for example, the header data cache 302 of FIG. 5A. The header data extractor preferably generates a header data cache index and provides it, in step 364, to a packet classification engine, such as, for example, the packet classification engine 304 of FIG. 5A. Using the header data cache index, the packet classification engine preferably retrieves the header data from the header data cache to perform one or more header checks.

The stored header data for the inbound packet may be retrieved all at the same time, or a portion of the stored header data may be retrieved at a time as needed. In step 368, the packet classification engine preferably retrieves a portion of the header data to perform a header check. In step 370, the packet classification engine preferably compares the retrieved header data to a pre-defined data in a header check to determine which of the two nodes of the next level to link to. The decision tree-based logic in this embodiment includes two potential links (branches) from the root to the second level nodes, and two links from the nodes at each level to the next level nodes. In other embodiments, there may be three or more potential links (branches) to the next level from the root and/or the nodes.

Based on the result of the header check, in step 372, a branch preferably is taken to a node on the next level. In step 374, a determination preferably is made as to whether a leaf has been reached. If the leaf has not been reached, the process preferably returns to step 368 to perform header checking and branching once more. If, however, a leaf has been reached, the classification for the packet has been determined, and therefore in step 376, the packet classification preferably is provided. For example, the packet classification may be provided to a packet buffer, such as, for example, the packet buffer 202 of FIG. 2, to be used for editing the inbound packet prior to being provided as an outbound packet.

IV. Programmable Disposition Logic

Figure 7:
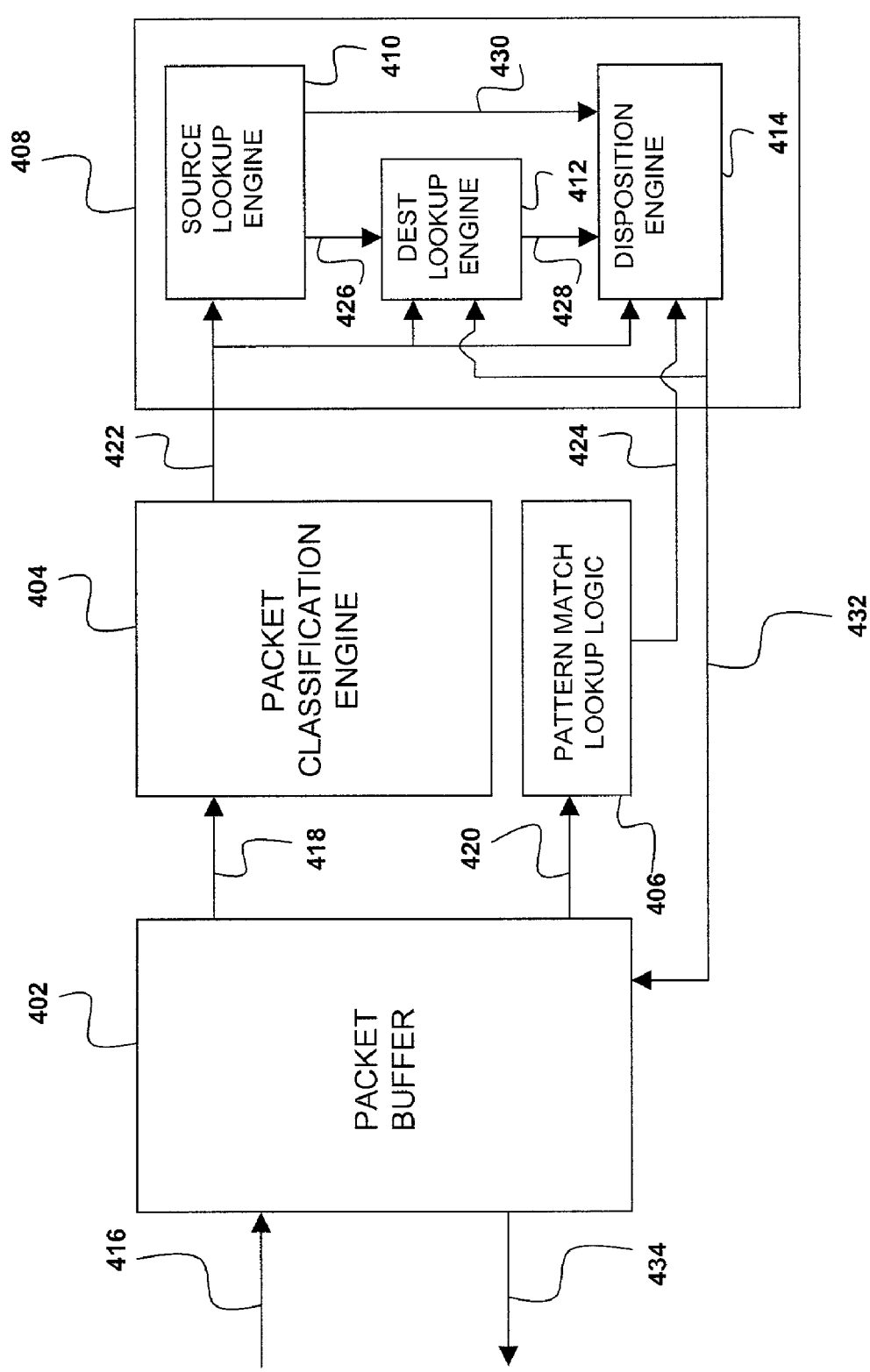
FIG. 7 is a block diagram of a packet switching controller with programmable disposition logic in one embodiment of the present invention.

FIG. 7 is a block diagram of a packet switching controller 400 with programmable disposition logic. The packet switching controller 400 may be similar, for example, to the packet switching controller 100 of FIG. 1. The packet switching controller includes a packet buffer 402, a packet classification engine 404, a pattern match lookup logic 406 and an application engine 408. The application engine includes a source lookup engine 410, a destination lookup engine 412 and a disposition engine 414. The packet classification engine, the source lookup engine, the destination lookup engine and the disposition engine preferably are programmable with one or more application programs. In other words, each of the packet classification engine and the sub-engines of the application engine preferably includes a programmable microcode-driven embedded processing engine.

The packet buffer 402 preferably receives and stores inbound packets 416. The packet buffer preferably provides the inbound packets or portions thereof 418 to the packet classification engine 404. The packet classification engine preferably classifies the packets using its application programs programmed thereon, and preferably provides a program identification 422 to the application engine 408. More particularly, the program identification 422 preferably is provided to the source lookup engine 410, the destination lookup engine 412 and the disposition engine 414 in the application engine. In one embodiment of the present invention, the packet classification engine 404 includes a decision tree-based classification logic.

The program identification 422 preferably is used to select application programs to be executed in each of the source lookup engine, the destination lookup engine and the disposition engine. The application programs to be executed in the source lookup engine, the destination lookup engine and the disposition engine preferably are selected based at least partly on packet classification information. The packet classification information may also be provided together with the program identification.

The packet buffer preferably also provides the inbound packets or portions thereof 420 to the pattern match lookup logic 406. The pattern match lookup logic preferably includes a predefined pattern against which the packets or the packet portions are compared. For example, the packet portions used for pattern matching may include portions of packet header data, packet payload data, or both the packet header data and the packet payload data. In other embodiments, the predefined pattern may reside in an external memory, which is accessed by the pattern match lookup logic for pattern matching. In still other embodiments, the match pattern may change during the operation of the packet switching controller.

After a comparison is made, a result 424 of the comparison preferably is provided to the application engine 408. More particularly, the result 424 of the comparison preferably is provided to the disposition engine 414 in the application engine. In some embodiments, the result may be provided to the disposition engine only when there is a match.

The source lookup engine 410 preferably generates a disposition recommendation 430 for an inbound packet at least partly by performing a source address lookup using a source address of the inbound packet. The disposition recommendation 430 preferably also depends on the application program executed in the source lookup engine 410 in accordance with the program identification provided by the packet classification engine. The disposition recommendation 430 preferably includes a security recommendation for the inbound packet.

In other embodiments, the source lookup engine 410 may be used to build one or more keys, which may then be used to look up the source address (e.g., IPSA) of the inbound packet in an address table. The keys may include, but are not limited to, one or more of Virtual LAN Identification (VLAN ID), application identification (APP ID) and IPSA. One or more keys built by the source lookup engine 410 may also be used to formulate a disposition recommendation, such as, for example, the security recommendation.

The destination lookup engine 412 preferably receives an output 426 from the source lookup engine 410. The output 426 may include the key used to look up the source address and/or the result of the lookup. The destination lookup engine preferably executes its application program identified by the packet classification engine 404 and generates a disposition recommendation 428. The disposition recommendation 428 is based at least partly on a destination address lookup using a destination address of the inbound packet. The disposition recommendation 428 preferably includes a policing recommendation. When the pattern match lookup logic 406 finds a match, however, the pattern match result 424 preferably overrides the policing recommendation.

In other embodiments, the destination lookup engine 412 may be used to build one or more keys, which may then be used to look up the destination address (e.g., IPDA) of the inbound packet in an address table. The keys may include, but are not limited to, one or more of Virtual LAN Identification (VLAN ID) application identification (APP ID) and IPDA.

The disposition engine 414 preferably receives a number of disposition recommendations including, but not limited to, the security recommendation in the disposition recommendation 430 and the policing recommendation in the disposition recommendation 428, and the pattern match result 424. The disposition engine preferably generates a disposition decision 432 based on the disposition recommendations as well as the packet classification and/or program identification. The disposition decision 432 may include one of the disposition recommendations. In general, the pattern match result 424 may override the policing recommendation in the disposition recommendation 428, and the policing recommendation may override the security recommendation in the disposition recommendation 430. The disposition decision 432 may be a part of an application data, which may include, but is not limited to, one or more of accounting data, routing data and policing data.

The disposition decision preferably is provided to the packet buffer to be used for editing the inbound packets to be provided as outbound packets 434. The disposition decision preferably is also fed back to the destination lookup engine, which may include the policing recommendation, for policing and accounting. In other embodiments, the packet switching controller may include a policing engine separate and apart from the destination lookup engine. In such cases, the disposition decision preferably is provided to the policing engine for policing and accounting. For example, when the inbound packet is dropped, the policing engine should be made aware of that fact.

Figure 8:
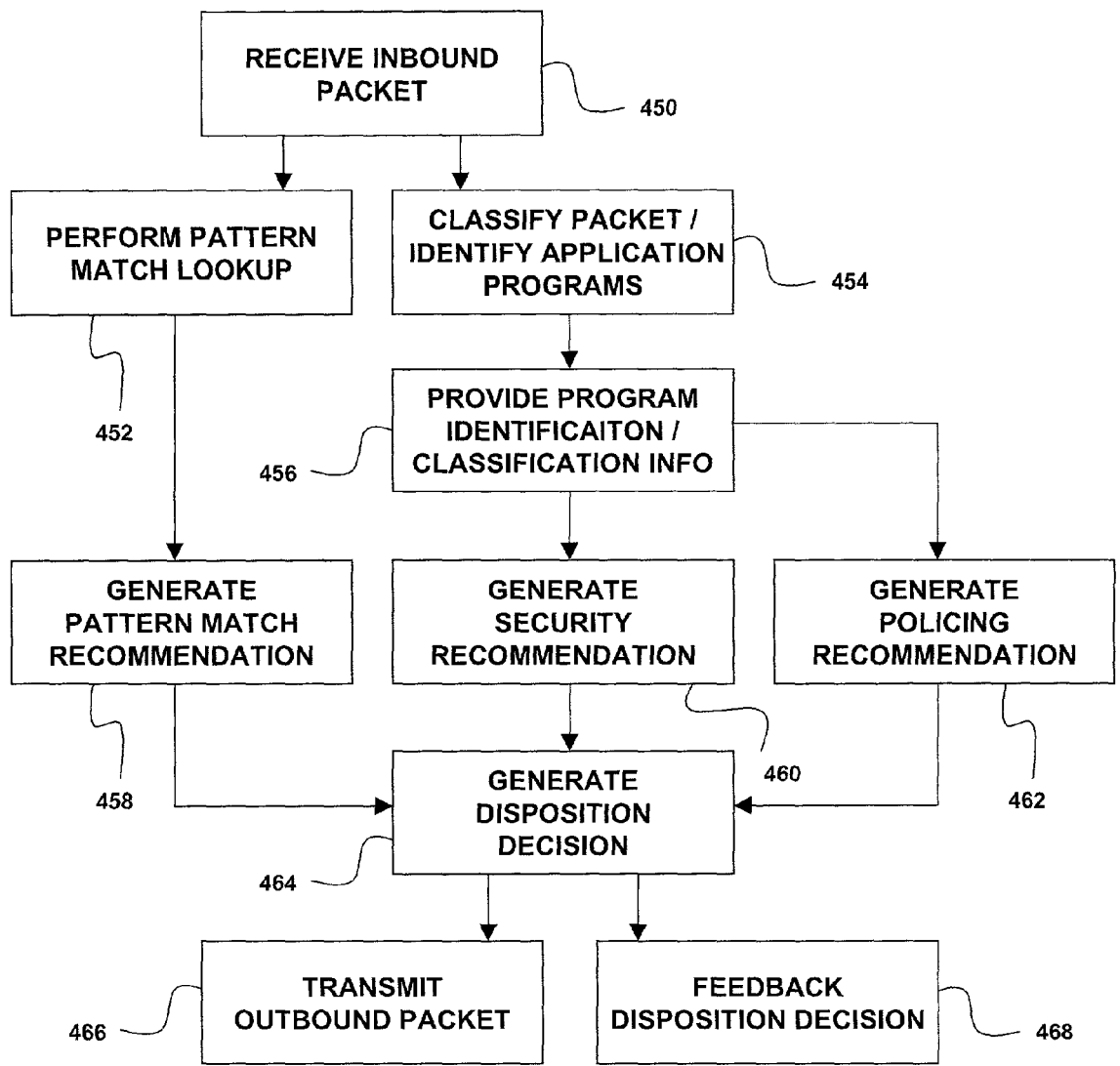
FIG. 8 is a flow diagram of a process of programmatically generating a disposition decision using a multiple disposition recommendations and classification information in one embodiment of the present invention.

FIG. 8 is a flow diagram of a process of programmatically generating a disposition decision using multiple disposition recommendations and classification information. In step 450, a packet buffer, such as the packet buffer 402 of FIG. 7, preferably receives an inbound packet. In the packet buffer, packet header data may be extracted and stored in a header data cache.

The inbound packet or a portion of the inbound packet, which may include the header data, preferably is provided to a pattern match lookup logic, such as the pattern match lookup logic 406 of FIG. 7. In step 452, the pattern match lookup logic preferably performs a pattern match lookup between the inbound packet or the portion of the inbound packet and a predetermined pattern to generate a pattern match recommendation as indicated in step 458. The predetermined pattern, for example, may be contained in an internal or external memory. In other embodiments, the match pattern may change dynamically.

Meanwhile, the inbound packet or a portion thereof preferably is also provided to a packet classification engine, such as the packet classification engine 404 of FIG. 7. In step 454, the packet classification engine preferably classifies the packet and identifies application programs based on the packet classification. The program identification preferably is provided to a source lookup engine, a destination lookup engine and a disposition engine in step 456. The program identification preferably indicates application programs to be executed in these sub-engines. The packet classification information preferably is also provided to the source lookup engine, the destination lookup engine and the disposition engine. The source lookup engine preferably generates a security recommendation in step 460, while the destination lookup engine preferably generates a policing recommendation in step 462.

In step 464, the pattern match recommendation, the security recommendation and the policing recommendation preferably are provided to a disposition engine, such as the disposition engine 414 of FIG. 7. The disposition engine 414 preferably generates a disposition decision using the selected application program as well as these disposition recommendations. The disposition decision preferably is provided to the packet buffer to be used for transmission of the inbound packet as an outbound packet. The disposition decision preferably is also fed back to the destination lookup engine for operations such as, for example policing and accounting.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

We claim:

1. A packet switching controller comprising:
a first engine; and
a second engine comprising one or more programmable elements, at least one programmable element containing one or more instruction sets,
wherein the first engine identifies an instruction set to be executed in the programmable element for a packet, and the programmable element executes the identified instruction set to process the packet, and further wherein the first engine indicates to a first programmable element in at least one pipeline to start processing the packet, and the first programmable element stops processing at the end of the identified instruction set, and the first programmable element indicates to a second programmable element in said pipeline to start processing the packet.

2. The packet switching controller of claim 1 wherein a plurality of identified instruction sets are executed sequentially to process the packet.

3. The packet switching controller of claim 1 wherein the programmable elements are organized into one or more pipelines, and the programmable elements in the pipelines execute a plurality of identified instruction sets to process the packet.

4. The packet switching controller of claim 3 wherein at least one programmable element generates an output, and at least one programmable element generates application data for the packet by using the output generated by a preceding programmable element in at least one pipeline.

5. The packet switching controller of claim 1 wherein at least one programmable element generates application data for the packet by using one or more of source address data of the packet, destination address of the packet, and a service classifier associated with the packet.

6. The packet switching controller of claim 1 wherein at least one programmable element generates application data for the packet, and wherein the application data includes one or more of accounting data, routing data and policing data.

7. The packet switching controller of claim 1 wherein the first engine classifies the packet in accordance with tree-based classification logic.

8. The packet switching controller of claim 1 wherein at least one of the programmable elements generates a disposition decision for the packet, and wherein the disposition decision is based on at least one of classification information for the packet and one or more disposition recommendations.

9. The packet switching controller of claim 8 wherein the classification information is provided by the first engine.

10. The packet switching controller of claim 8 wherein the disposition recommendations are provided by one or more programmable elements.

11. A method of processing a packet using a packet switching controller having a first engine and a second engine, the second engine comprising one or more programmable elements, the method comprising the steps of:
identifying an instruction set to be executed for the packet in at least one programmable element;
classifying, using the first engine, the packet in accordance with tree-based classification logic;
executing the identified instruction set to process the packet;
indicating, using the first engine, to a first programmable element in at least one pipeline to start processing the packet;
stopping processing in the first programmable element at the end of the identified instruction set; and
using the first programmable element to a second programmable element in said pipeline to start processing the packet.

12. The method of claim 11 wherein the step of executing the identified instruction set comprises the step of executing a plurality of identified instruction sets sequentially to process the packet.

13. The method of claim 11 wherein the programmable elements are organized into one or more pipelines, and the step of executing the identified instruction set comprises the step of executing a plurality of identified instruction sets in the pipelines.

14. The method of claim 13 further comprising the step of:
generating an output from one or more programmable elements,
wherein at least one programmable element generates application data for the packet by using the output generated by a preceding programmable element in at least one pipeline.

15. The method of claim 11 wherein at least one programmable element generates application data for the packet by using one or more of source address data of the packet, destination address data of the packet, and a service classifier associated with the packet.

16. The method of claim 11 wherein at least one programmable element generates application data for the packet, and wherein the application data include one or more of accounting data, routing data and policing data.

17. The method of claim 11 further comprising the step of providing a disposition decision for the packet, wherein the disposition decision is based on at least one of classification information for the packet and one or more disposition recommendations.

18. The method of claim 17 further comprising the step of identifying the classification information in the first engine.

19. The method of claim 17 father comprising the step of generating the disposition recommendations in one or more programmable elements.

* * * * *